(12) United States Patent
Palomares Rentero et al.

(10) Patent No.: US 9,793,756 B2
(45) Date of Patent: Oct. 17, 2017

(54) BACK-UP ENERGY STORAGE WITH IN-RUSH CURRENT LIMITING FOR WIND TURBINE PITCH DRIVE

(71) Applicant: Alstom Renovables España, S. L., Barcelona (ES)

(72) Inventors: Pedro Palomares Rentero, Barcelona (ES); Alejandro Rujas, Mondragón (ES); Héctor Ortiz De Landazuri, Barcelona (ES)

(73) Assignee: ALSTOM Renewable Technologies, Grenoble (FR)

( * ) Notice: Subject to any disclaimer, the term of this patent is extended or adjusted under 35 U.S.C. 154(b) by 46 days.

(21) Appl. No.: 14/321,662

(22) Filed: Jul. 1, 2014

(65) Prior Publication Data

US 2015/0008671 A1    Jan. 8, 2015

(30) Foreign Application Priority Data

Jul. 5, 2013    (EP) .................................... 13382279

(51) Int. Cl.

| | |
|---|---|
| *F03D 9/00* | (2016.01) |
| *H02J 11/00* | (2006.01) |
| *H02J 9/06* | (2006.01) |
| *F03D 7/02* | (2006.01) |
| *F03D 80/00* | (2016.01) |
| *F03D 9/25* | (2016.01) |

(52) U.S. Cl.
CPC ............ *H02J 11/00* (2013.01); *F03D 7/0224* (2013.01); *F03D 9/255* (2017.02); *F03D 80/00* (2016.05); *H02J 9/062* (2013.01); *F05B 2260/42* (2013.01); *Y02B 10/72* (2013.01); *Y02E 10/72* (2013.01); *Y02E 10/766* (2013.01)

(58) Field of Classification Search
CPC ........ F03D 11/00; F05B 2260/42; H02J 9/062
USPC ..................................... 290/44, 55
See application file for complete search history.

(56) References Cited

U.S. PATENT DOCUMENTS 5,907,192 A * 5/1999 Lyons .................. F03D 7/0224
                                                    290/42
6,181,029 B1    1/2001 Berglund et al.
(Continued)

FOREIGN PATENT DOCUMENTS

DE        103 35 575 A1    3/2005
DE        102010016105     9/2011
(Continued)

OTHER PUBLICATIONS

European Search Report for EP 13382279, mailed Dec. 10, 2013, 6 pgs.

*Primary Examiner* — Julio C. Gonzalez R.
(74) *Attorney, Agent, or Firm* — Dority & Manning, P.A.

(57) ABSTRACT

A wind turbine pitch drive system comprises an electric grid for supplying electrical power, a motor for driving a pitch actuator, an electronic converter for controlling the motor and a back-up energy storage unit for supplying electrical power. The electronic converter comprises a DC-link capacitor bank. The system furthermore comprises a switching device for selectively connecting the DC-capacitor bank link to the back-up energy storage unit, and a frequency generator for controlling the switching device. Also disclosed is a method for protecting a component of the electronic converter.

13 Claims, 2 Drawing Sheets

(56) References Cited

U.S. PATENT DOCUMENTS

| | | | |
|---|---|---|---|
| 2007/0057516 A1* | 3/2007 | Mever | F03D 7/0224 |
| | | | 290/44 |
| 2009/0230689 A1* | 9/2009 | Burra | F03D 9/003 |
| | | | 290/55 |
| 2010/0295304 A1* | 11/2010 | Rowan | F03D 7/0224 |
| | | | 290/44 |
| 2013/0020804 A1* | 1/2013 | Roesmann | F03B 15/00 |
| | | | 290/44 |
| 2013/0049699 A1 | 2/2013 | Jayaraman et al. | |
| 2013/0334818 A1* | 12/2013 | Mashal | F03D 7/0264 |
| | | | 290/44 |
| 2015/0145251 A1* | 5/2015 | Wagoner | F03D 7/0272 |
| | | | 290/44 |

FOREIGN PATENT DOCUMENTS

| | | |
|---|---|---|
| EP | 1 763 126 A1 | 3/2007 |
| WO | WO 2007/132303 A1 | 11/2007 |
| WO | WO 2009/008863 A1 | 1/2009 |

\* cited by examiner

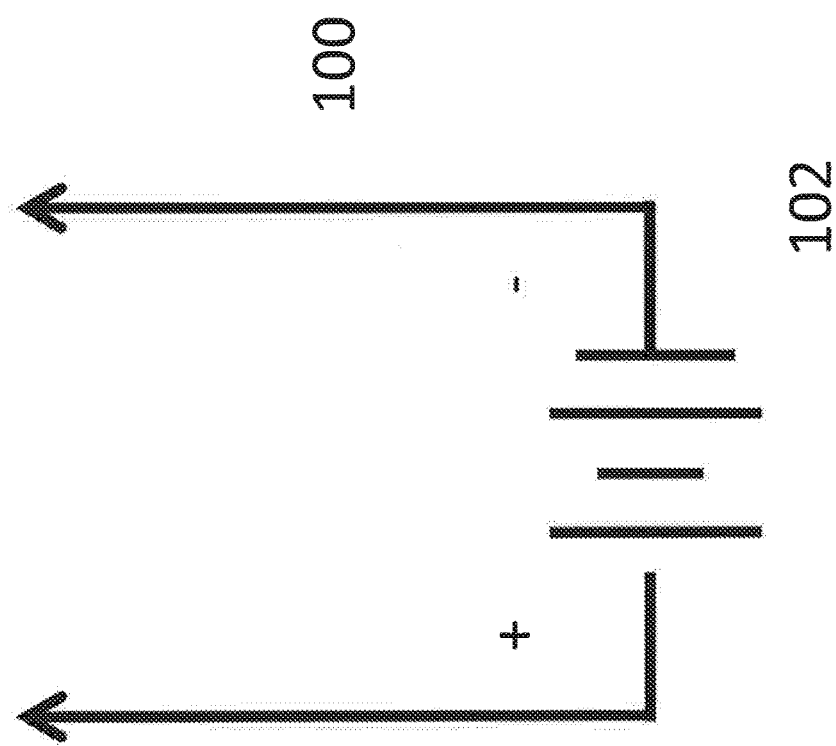

BACK-UP ENERGY STORAGE WITH IN-RUSH CURRENT LIMITING FOR WIND TURBINE PITCH DRIVE

This application claims the benefit of European Patent Application 13382279.1 filed on Jul. 5, 2013, the entire contents of which are hereby incorporated by reference for all purposes.

The present disclosure relates to pitch drive systems for rotating one or more rotor blades of a wind turbine around their longitudinal axes.

BACKGROUND ART

Wind turbines comprise pitch drives for rotating the rotor blades longitudinally in order to control the power extracted by the rotor and to mitigate the loads suffered by the structure as wind speed changes. By continuously adjusting the blade pitch angle, the aerodynamic angle of attack is adapted so that the influence of the wind on the blades can be increased or decreased. Each blade may have its independent pitch drive. Alternatively, a common pitch drive may be provided for a plurality of blades.

Blade feathering, consisting of turning the blades about 90 degrees about their longitudinal axis, is performed during emergency shutdowns, or whenever the wind speed exceeds the maximum rated speed, so that aerodynamic braking is generated to stop the wind turbine. Moreover, during maintenance of wind turbines, the blades are usually feathered to reduce unwanted rotational torque in the event of wind gusts.

A wind turbine pitch drive may comprise an electric motor which is powered by the electric grid via a power electronic converter. The electric motor may be an AC motor, or alternatively a DC motor. In other cases, a hydraulic pitch motor may be used. Depending on the motor type, the electronic converter may include an AC to DC power converter (rectifier), a DC link (capacitor bank), and a DC to AC power converter (inverter).

The pitch motors drive an actuator (e.g. a pinion or a hydraulic piston) which rotates the blade.

A back-up energy storage unit comprising a battery or a capacitor may be coupled to the electronic converter DC-link circuit by diodes for buffering during voltage fluctuations or transient voltage dips. The energy required can thus be drawn from the storage units. Furthermore, these energy storage units ensure the reliable functioning of the blade pitch drive in the event of a complete loss of power from the electric grid or when used during maintenance operations.

It is known that back-up energy storage units within modern wind turbine pitch systems may comprise one or more ultra-capacitors. Ultra-capacitors are particularly suited for remote and offshore wind power applications because of their high reliability, their efficiency, their easy monitoring and their long operating life (i.e. high number of charge/discharge cycles). Batteries, on the other hand, require ongoing measurement of their state of health and state of charge to avoid costly repairs or unsafe operating conditions.

However, whilst a traditional electrochemical battery releases its energy through processes that limit discharge currents; this is not the case with ultracapacitors. Thus, when the ultracapacitors are fully charged and the voltage at the DC-link to which they are connected is at or close to zero volts (e.g. because grid voltage is zero or no connection with the electrical grid exists during maintenance operations, so the capacitors at the DC-link are discharged), the ultracapacitors discharge from its initial charge state to zero voltage in a very short time, thus resulting in very high in-rush currents which can damage the diodes, transistors and other electronic components within the electronic converter.

This problem is currently being addressed by manually pre-discharging the energy storage units, which is a time and resource consuming task. Furthermore, as ultracapacitors are especially used in offshore installations, the frequency of manual operations is further required to be kept at a minimum due to very high costs related to such activities.

Therefore, there is a need for systems for wind turbine pitch drive which protect the connected electrical components and methods for protection during grid power outage or in maintenance mode.

SUMMARY

In a first aspect, a wind turbine pitch drive system is provided, comprising an electric grid for supplying electrical power, a motor for driving a pitch actuator, an electronic converter for controlling the motor and a back-up energy storage unit for supplying electrical power. The electronic converter comprises a DC-link capacitor bank, and the system furthermore comprises a switching device for selectively connecting the DC-link to the back-up energy storage unit, and a frequency generator for controlling the switching device.

Damaging in-rush currents from the back-up energy storage, which are caused by a relatively high difference in voltage between the back-up energy storage and the DC-link of the electronic converter, may be effectively avoided by high frequency switching. As the back-up energy storage is disconnected and connected to the DC-link with a high frequency, the one or more capacitors of the DC-link capacitor bank are more slowly charged, thus controlling the difference in voltage level between the back-up energy storage and the DC-capacitor bank and, consequently, limiting the value of circulating current.

Herein, the electrical grid may be the national grid or alternatively may be e.g. the "main" electrical grid of the wind park, or a portion of the local grid that is connected to the "main" wind park electrical grid through a transformer.

In another aspect, a method for protecting a component of an electronic converter of a in such a system is provided. The method comprises detecting a difference between a voltage level of the DC-link of the electronic converter and a voltage level of the energy storage unit, and the frequency generator generating a high frequency pulse based on the detected difference in voltage level, and using the high frequency pulse to intermittently switch the switching device on and off to control the in-rushing current from the energy storage unit.

In some embodiments, detecting a difference between the voltage level of the DC-link of the electronic converter and the voltage level of the energy storage unit comprises measuring the voltage level of the energy storage unit. The voltage level of the energy storage unit may be measured substantially continuously or intermittently. Alternatively, the voltage level of the energy storage unit may be assumed to be at the rated level. In most cases, the voltage level of the energy storage unit will be close to the rated level if the pitch drive has been functioning normally.

In some embodiments, detecting a difference between the voltage level of the DC-link of the electronic converter and the voltage level of the energy storage unit comprises measuring a voltage level at the DC-link. Alternatively to measuring the voltage level at the DC-link, the voltage level at the electrical grid may be measured.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawing, in which:

FIG. 2 illustrates at least one battery (102) of the back-up energy storage unit (100) according to another embodiment.

DETAILED DESCRIPTION OF EMBODIMENTS

Figure 1:
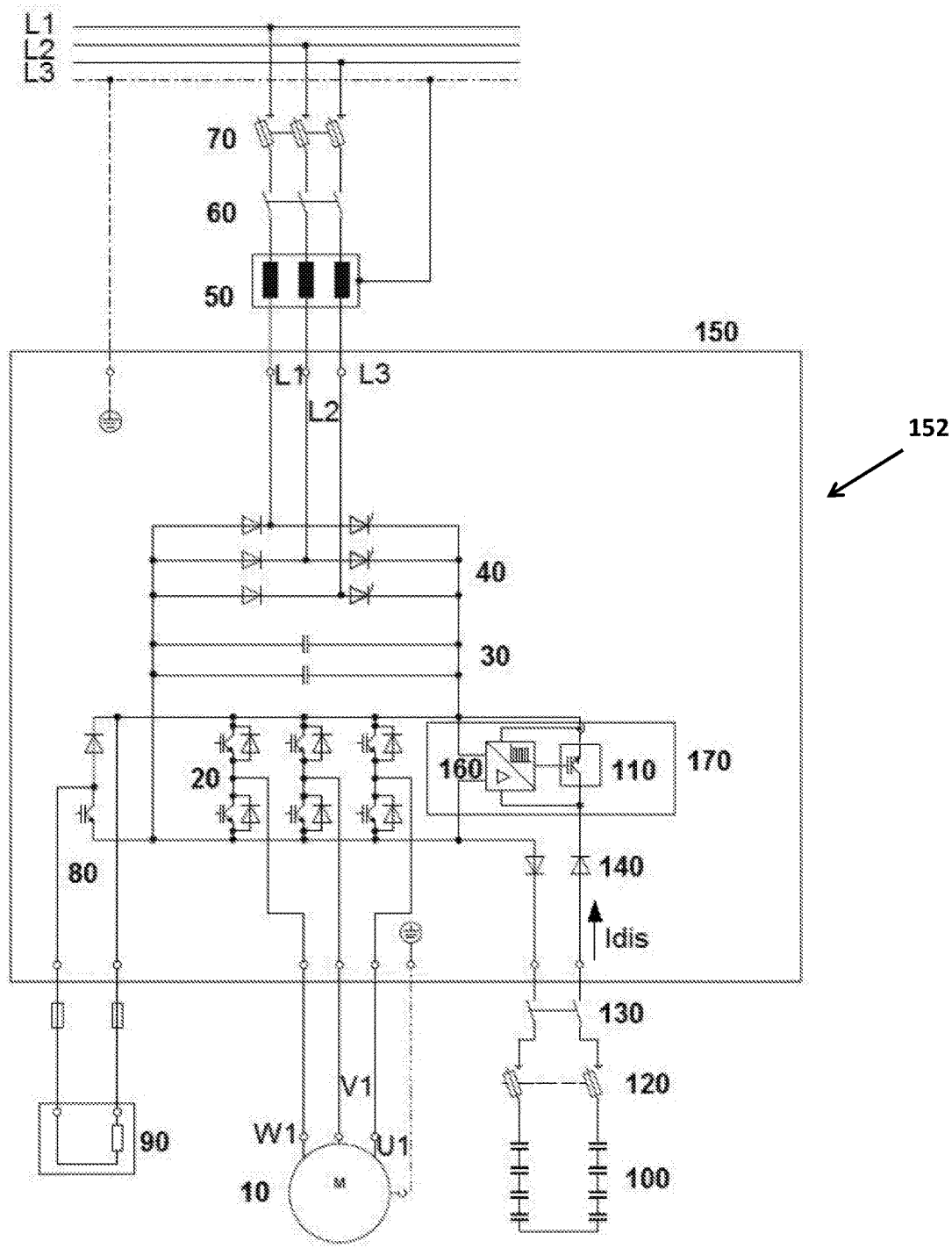
FIG. 1 illustrates an example wherein a wind turbine pitch drive comprises a controlled switching module between the back-up energy storage unit and the DC-link of the electronic power converter.

The system and method disclosed herein provide protection to wind turbine pitch drives from in-rush currents discharged from the back-up energy storage unit during maintenance operations.

The embodiment illustrated in FIG. 1 shows a pitch drive electrical system of a wind turbine. The 3 phases lines (W1, V1, U1) of the pitch drive motor (10) are each respectively connected to the 3 phases lines (L1, L2, L3) of the electrical grid, across the pitch drive electronic power converter (150). This pitch drive electronic converter may comprise a thyristor bridge (40) to rectify AC to DC power, a DC link capacitor bank (30) to stabilise the power and a power stage (20) to invert DC to AC power and a brake chopper (80) to dissipate excess energy, e.g. energy generated by the pitch drive motor (10) when it operates as a generator.

Other components (152) such as a grid power choke (50), a grid contactor (60) and grid fuses (70) and a braking resistor (90) may also be included and are also represented on FIG. 1.

In addition, this embodiment comprises a back-up energy storage unit (100) with multiple ultracapacitors which are in-turn connected to the DC-link capacitors (30) across a switching module (170) which comprises a switching device (110) and a frequency generator (160) for controlled modification of the in-rush currents (Idis) from the back up energy storage unit (100) when connected to the pitch drive electronic converter (150) during e.g. maintenance.

Other components (152) such as back-up circuit fuses (120), a back-up circuit contactor (130) and back-up circuit diodes (140) may also be included and are also illustrated in this figure.

In one embodiment, the controlled switching device (110) and the back-up circuit diodes (140) may be physically located within the pitch drive's power electronic converter (150). In other embodiments, the controlled switching device (110) and the frequency generator (160) and the back-up circuit diodes may be external to the pitch drive electronic converter. In this case, they may still be controlled by the electronic converter (150).

In the present disclosure, the term ultracapacitor is to be interpreted as also referring to supercapacitors and electric double layer capacitors. In another embodiment the energy storage unit may comprise a battery (102) as shown in FIG. 2.

During maintenance, the effect of connecting the energy storage unit's (100) charged ultracapacitors to the DC-link (30) across the switching module (170) is that of damping or dimming the in-rush current waveform in a controlled manner by modulating the duty cycle of the switching device (110), using e.g. pulse width modulation (PWM) or pulse frequency modulation (PFM) so that it is not harmful to the electronic components in the pitch drive electronic converter.

In one embodiment, the frequency generator (160) may be a pulse generator (160). In one example, the pulse generator may be an electronic chopper.

In some embodiments, the controlled switching device (110) may be an Insulated Gate Bipolar Transistor (IGBT). An IGBT is a three-terminal power semiconductor device primarily used as an electronic switch and in newer devices is noted for combining high efficiency and fast switching. In other embodiments, the controlled switching device may e.g. be a thyristor.

One embodiment of the method of this invention may comprise detecting a voltage level in the electric grid supplied voltage below a predetermined threshold, generating a high frequency pulse, and controlling the high frequency pulse to intermittently switch the switching device on and off to dampen the in-rushing current from the energy storage unit's ultracapacitor by continuously adapting to the difference between the voltage level in the electric grid and the voltage level at the energy storage unit.

In an alternative embodiment, the voltage at the DC-link may be otherwise used to perform said controlled switching, so that in this case the switching may be adapted to the voltage difference between the DC-link and the energy storage unit.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A wind turbine pitch drive system comprising:
an electric grid configured to supply electrical power;
a motor configured to drive a pitch actuator;
an electronic converter configured to control the motor, the electronic converter including a DC-link capacitor bank;
a back-up energy storage unit configured to supply electrical power;
a switching device configured to selectively connect the DC-link capacitor bank to the back-up energy storage unit; and
means for protecting the electronic converter from damaging in-rushing current by controlling the in-rushing current from the back-up energy storage unit to the DC-link, wherein the in-rushing current is the current that occurs when the back-up energy storage unit is substantially charged and the DC-link to which the back-up energy storage unit is connected is substantially discharged, and energy supply is switched to the back-up energy storage unit; and
wherein the means for protecting comprises a frequency generator configured to generate a high frequency pulse based on a detected difference in voltage level between the back-up energy storage unit and the D-C link.

2. The system according to claim 1, wherein the back-up energy storage unit comprises at least one ultra-capacitor.

3. The system according to claim 1, wherein the back-up energy storage unit comprises at least one battery.

4. The system according to claim 1, wherein the switching device is an insulated gate bipolar transistor.

5. The system according to claim 1, wherein the switching device uses the high frequency pulse generated by the frequency generator to apply pulse width modulation to control the in-rushing current.

6. The system according to claim 1, wherein the switching device uses the high frequency pulse generated by the frequency generator to apply pulse frequency modulation to control the in-rushing current.

7. A method for protecting a component of an electronic converter in a wind turbine pitch drive system that includes: an electric grid configured to supply electrical power; a motor configured to drive a pitch actuator; an electronic converter configured to control the motor, the electronic converter including a DC-link capacitor bank; a back-up energy storage unit configured to supply electrical power; a switching device configured to selectively connect the DC-link capacitor bank to the back-up energy storage unit; and a frequency generator configured to control the switching device, the method comprising:

detecting a difference between a voltage level of the DC-link capacitor bank of the electronic converter and a voltage level of the back-up energy storage unit such that the voltage level of the back-up energy storage unit is higher than the voltage level of the DC-link capacitor bank;

generating a high frequency pulse, from the frequency generator, based on the detected difference in voltage level; and using the high frequency pulse to intermittently switch the switching device on and off to control an in-rushing current from the back-up energy storage unit.

8. The method according to claim 7, wherein the using of the high frequency pulse to intermittently switch the switching device comprises applying pulse modulation.

9. The method according to claim 8, wherein the pulse modulation applied is pulse width modulation.

10. The method according to claim 8, wherein the pulse modulation applied is pulse frequency modulation.

11. The method according to claim 7, wherein the detecting of a difference between the voltage level of the DC-link capacitor bank of the electronic converter and the voltage level of the back-up energy storage unit comprises measuring the voltage level of the back-up energy storage unit.

12. The method according to claim 7, wherein the detecting of a difference between the voltage level of the DC-link capacitor bank of the electronic converter and the voltage level of the back-up energy storage unit comprises measuring a voltage level at the DC-link capacitor bank.

13. The method according to claim 7, wherein the detecting of a difference between the voltage level of the DC-link capacitor bank of the electronic converter and the voltage level of the back-up energy storage unit comprises measuring a voltage level at the electric grid.

\* \* \* \* \*